United States Patent [19]

Kapanen et al.

[11] Patent Number: 5,308,384
[45] Date of Patent: May 3, 1994

[54] DEAERATION VESSEL

[75] Inventors: Kari Kapanen; Seppo Lukkarinen; Jouni Parviainen, all of Savonlinna; Pentti Vikiö, Kerimäki, all of Finland

[73] Assignee: A. Ahlstrom Corporation, Noormarkku, Finland

[21] Appl. No.: 953,688

[22] Filed: Oct. 1, 1992

[30] Foreign Application Priority Data

Oct. 16, 1991 [FI] Finland ................. 914871

[51] Int. Cl.⁵ ........................................... B01D 19/00
[52] U.S. Cl. ...................................... 95/260; 95/266; 96/200; 96/203; 96/220
[58] Field of Search ............. 55/52, 55, 171-176, 55/189-194; 95/260, 266, 241; 96/193, 197, 200, 208, 220

[56] References Cited

U.S. PATENT DOCUMENTS

| Re. 29,472 | 11/1977 | Kaiser | 162/343 |
|---|---|---|---|
| 2,657,760 | 11/1953 | Glasgow | 55/174 X |
| 3,206,917 | 9/1965 | Kaiser et al. | 55/41 |
| 3,432,036 | 3/1969 | Kaiser | 55/194 X |
| 3,538,680 | 11/1970 | Kaiser | 55/194 X |
| 4,419,109 | 12/1983 | Matula | 55/192 |
| 4,443,232 | 4/1984 | Kaiser | 55/194 X |
| 4,478,615 | 10/1984 | Kaiser | 55/194 X |
| 5,084,161 | 1/1992 | Vikio | 209/2 |

FOREIGN PATENT DOCUMENTS

| 647614 | 11/1928 | France | 55/172 |
|---|---|---|---|
| WO86/03252 | 6/1986 | PCT Int'l Appl. | 55/174 |

*Primary Examiner*—Robert Spitzer
*Attorney, Agent, or Firm*—Nixon & Vanderhye

[57] ABSTRACT

A deaeration vessel has a partition wall dividing the hollow vessel body into first and second portions, and defining a weir with a top surface establishing the level of pulp suspension in the vessel body. Turbulence in the deaerated pulp is minimized by providing the outlet for deaerated pulp immediately adjacent the partition wall, in the bottom of the vessel body first portion (on the same side of the weir as the inlet conduits for the suspension being deaerated). The weir is preferably configured so that the top surface, defining the liquid level within the vessel, overlies the outlet. A partition wall may extend substantially linearly at an angle of about 60° to the bottom of the vessel, or it may have a vertical bottom with a top extending at an angle to the bottom, or it may be continuously curved from the vessel bottom to the top surface, about a horizontal and/or vertical axis. The outlet may have an enlarged, non-circular configuration at the bottom, which then tapers to a circular outlet conduit.

22 Claims, 5 Drawing Sheets

DEAERATION VESSEL

BACKGROUND AND SUMMARY OF THE INVENTION

The present invention relates to a deaeration vessel as used in the paper and pulp industry. The invention relates specially to an improvement both in the outlet duct of the main stock flow and the weir used for maintaining a constant level of liquid.

The best known commercially available deaeration vessel is sold under the trade mark DECULATOR by A. Ahlstrom Corporation of Finland. Deaeration vessels are designed to remove air and other gases from cellulose fiber suspensions, and simultaneously separate other light impurities, that would otherwise be detrimental to the paper-making process.

Deaeration vessels are large vessels, into which the fiber suspension is introduced as dilute mixture (e.g. about 0.1–3%, typically about 0.4–1%, consistency). The operating principle of the vessel is to boil the fiber suspension in sub-atmospheric pressure and thus separate the gas into a gas space within the vessel and then to withdraw it from the vessel, and to allow other light impurities to be separated by movement onto the liquid surface in the vessel because of their relatively small density. The suspension is withdrawn via an opening in the bottom of the vessel, in as "deaerated" a state as possible, and directed to the paper-making machine.

In order to maximize the deaerating capability of the vessel, the vessel is evacuated by means of a vacuum pump, so that the gas is withdrawn through the vacuum pump. The deaerating capability is further enhanced by introducing the suspension via nozzles above the liquid level in the vessel, whereby the gas, if any, present in the suspension in the form of bubbles is separated even before the introduced suspension contacts the suspension in the vessel. Besides regulating the level of liquid, the overflow is used for removing any light impurities collected on the liquid surface in the vessel, so as not to allow them to reach the paper-making machine. The light impurities flow over the weir to reject and further treatment, so that the impurities are separated from the suspension as is described in U.S. Pat. No. 5,084,161, the disclosure of which is incorporated by reference herein.

Conventionally the weir is usually located near one end of the vessel, and the outlet for the suspension to be directed to paper-making machine is located at about the middle of the vessel, as shown in U.S. Pat. Nos. 3,206,917, 4,419,109, and Re. 29, 472. The tendency of the deaerated suspension to form turbulence and thereby pressure fluctuations near and at the outlet, has long been a problem. The turbulence and pressure fluctuations are caused when the direction of the flow changes from a horizontal vessel flow to a downward outlet flow. It has been determined according to the invention that the source of the turbulence is on the surface of the suspension, where a formed vortex—when of sufficient magnitude—induces a pressure pulse in the suspension to be withdrawn, or, at least entrains suspension actually meant to be withdrawn at the overflow with light impurities accumulated therein. Besides the pressure fluctuations caused by the turbulence in the flow to the paper-making machine, the turbulence causes fluctuations in the exhaust overflow that is returned to circulation after treatment, which in turn causes instability.

The long-standing turbulence problem is significant because the web-forming process of a paper-making machine is very sensitive to different oscillations caused by the flow, turbulence, waving etc. of the suspension.

The improved deaeration vessel according to the invention overcomes the above drawbacks in prior art vessels. The vessel of the invention optimizes the relative locations of the weir and the outlet for the deaerated suspension so that no detrimental turbulence is formed, so that both the quality of the suspension directed to the paper-making machine and the steady operation of the process are improved. Also, the end product, i.e. paper, encounters no quality problems due to malfunctions of the deaeration apparatus. According to the invention, the vibration of the vessel itself, due to the movement of the suspension, is also significantly reduced compared to prior art vessels.

A characteristic feature of a deaeration vessel according to the invention is that the partition wall forming the weir is located immediately adjacent (e.g. less than about 50–250 mm from) the downstream side of the periphery of the deaerated medium outlet.

The invention also contemplates a method of deaerating cellulose pulp suspension, such as one having a consistency of about 0.1–3%, typically about 0.4–1%. The method comprises the steps of: Introducing pulp suspension into the vessel first portion above the liquid level. Withdrawing gas which separates from the pulp suspension from above the liquid level. Withdrawing liquid that passes over the weir from the second portion of the vessel. And, withdrawing deaerated pulp from the first portion immediately adjacent the weir so as to minimize turbulence in and of the deaerated pulp suspension withdrawn from the vessel first portion. The method may also comprise the additional step of directing deaerated suspension toward the bottom of the weir by the weir configuration, i.e. by defining the top surface, liquid level defining, portion of the weir so that it overlies the outlet through which the deaerated suspension is withdrawn.

It is the primary object of the present invention to provide a deaeration vessel (and method of the utilization of the same) which is advantageous compared to the prior art. This and other objects of the invention will become clear from an inspection of the detailed description of the invention and from the appended claims.

DETAILED DESCRIPTION OF THE DRAWINGS

Figure 1:
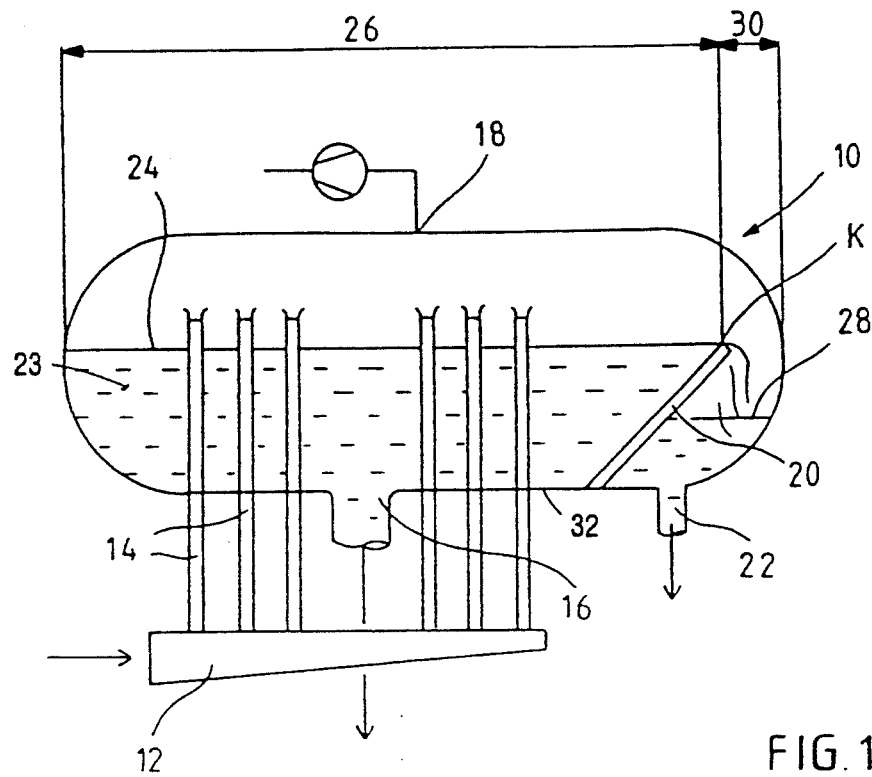
FIG. 1 is a schematic cross-sectional view of an exemplary prior art deaeration vessel.

As is shown in FIG. 1, a conventional prior art (e.g. as shown in U.S. Pat. No. 3,206,917) deaeration vessel 10 comprises an inlet header 12 for fluent material (e.g. a pulp suspension, or a liquid) to be deaerated, inlet nozzles 14, an outlet 16 for the deaerated suspension, a gas evacuation/vacuum duct 18 at the top thereof, a partition wall 20 forming the weir K, and an outlet 22 for light liquids which flow over weir K. The suspension 23 in the vessel 10 has a first surface 24 in the deaeration portion 26 to the left of weir K and a second surface 28 in the light liquid outlet portion 30 to the right of weir K. The outlet 16 for deaerated suspension is located at the bottom 32 of the vessel 10, at about the middle of the deaeration portion 26. The weir-defining partition 20 comprises a plate located in an inclined position, i.e. the plate has been inclined in the direction of the overflow, at one end of the vessel 10, so that the deaeration portion 26 is as large as possible in relation to the total volume of the vessel 10. Thus the outlet duct 16 and the weir K are located arbitrarily in relation to each other, i.e. without a connection to each other.

Figure 2:
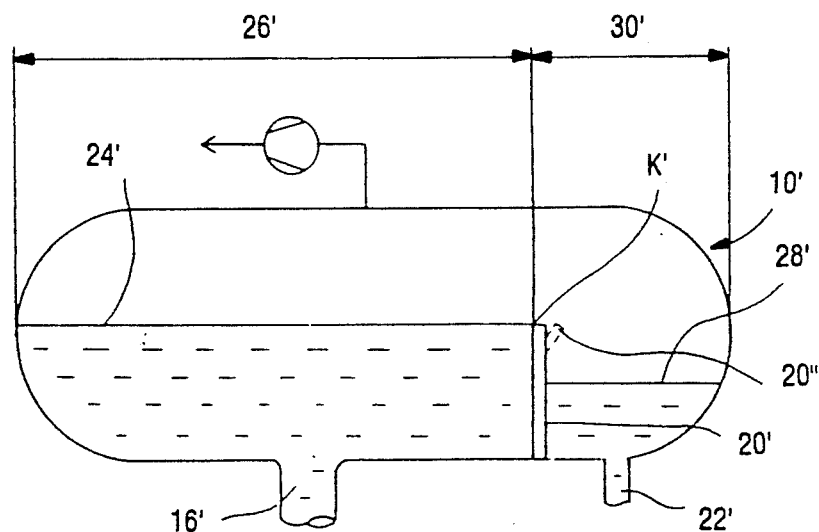
FIG. 2 is a schematic cross-sectional view of another conventional prior art deaeration apparatus.

FIG. 2 illustrates another conventional prior art deaeration vessel (as in U.S. Re. 29,742) in which the weir K' partition 20' is a vertical plate, or the upper lip of the weir K' partition 20" has been bent out co-currently with the overflow. The bend stiffens the plate. In this embodiment, too, the outlet 16' for deaerated suspension is located at about the middle of the deaeration portion 26' with no connection to the weir K' partition 20' or 20", or light liquid outlet 22'. The liquid level in the main section of vessel 10' is shown by reference numeral 24', while the liquid level in the section 30' is shown by reference numeral 28'.

Figure 3:
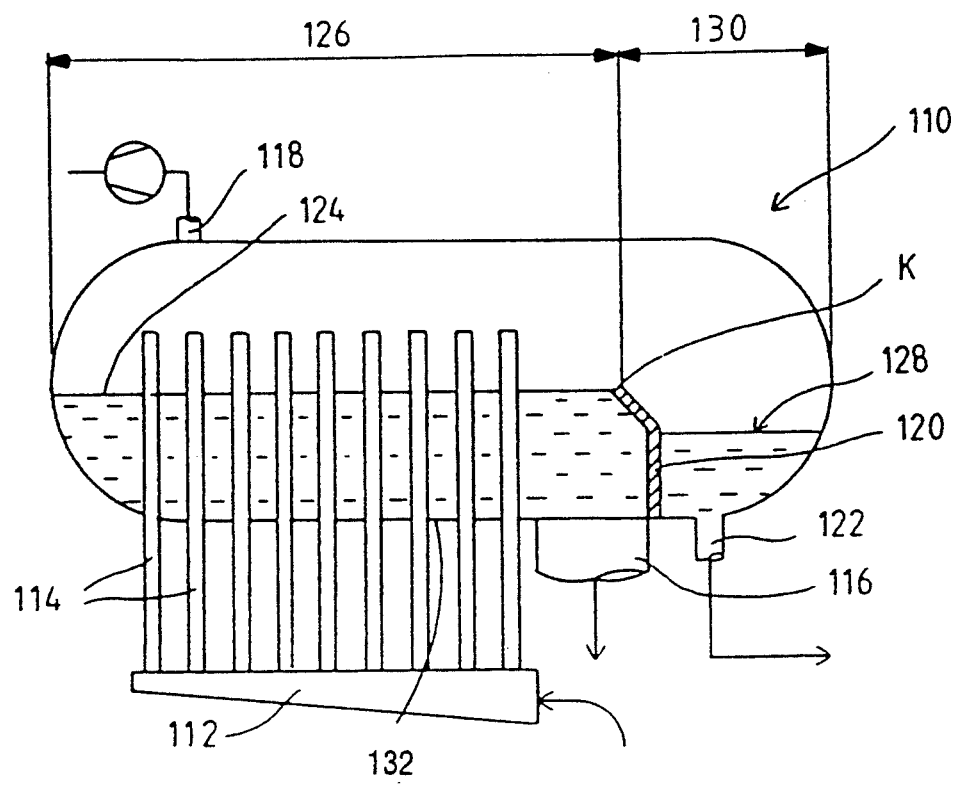
FIG. 3 is a schematic cross-sectional view of a first preferred embodiment of a deaeration apparatus according to the invention.
Figure 4:
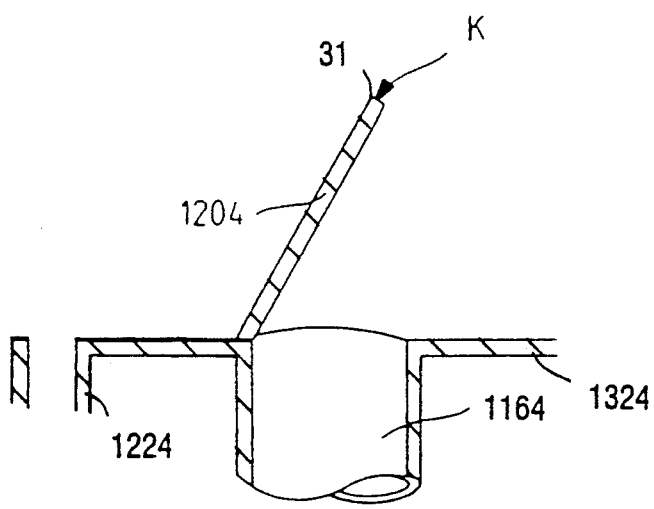
FIG. 4 is a detailed side view of a modified embodiment of a weir according to the invention, utilizable in the vessel of FIG. 3.
Figure 5:
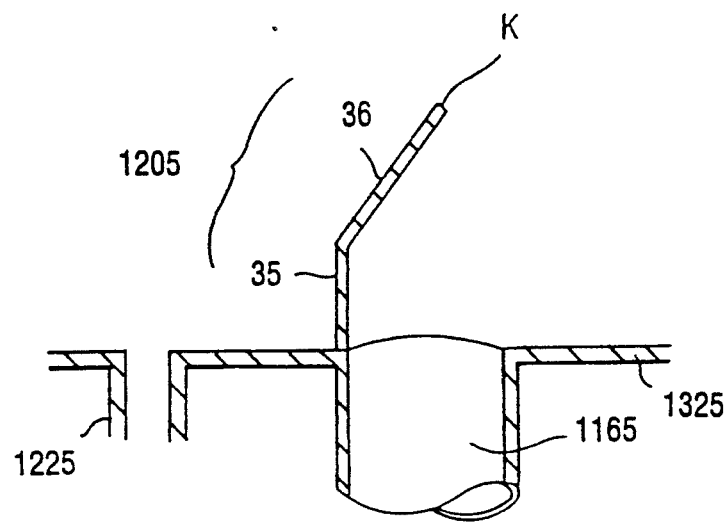
FIGS. 5 and 6 are detailed side views of other embodiments of a weir according to the invention, utilizable in the vessel of FIG. 3.
Figure 6:
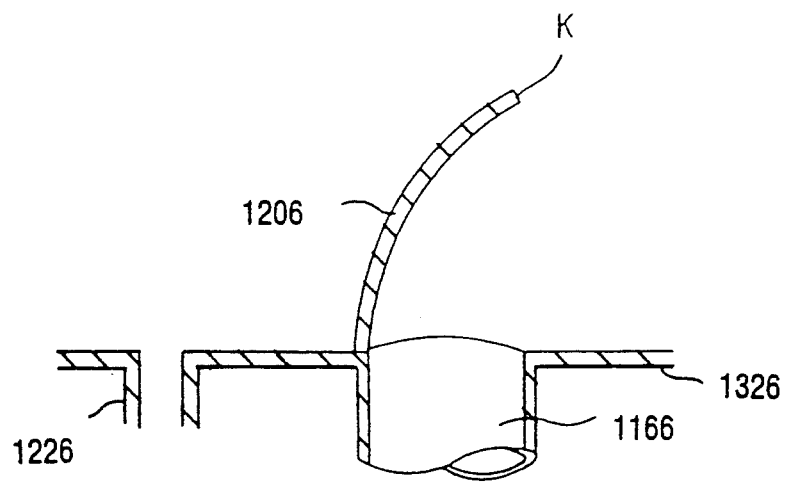
Figure 10:
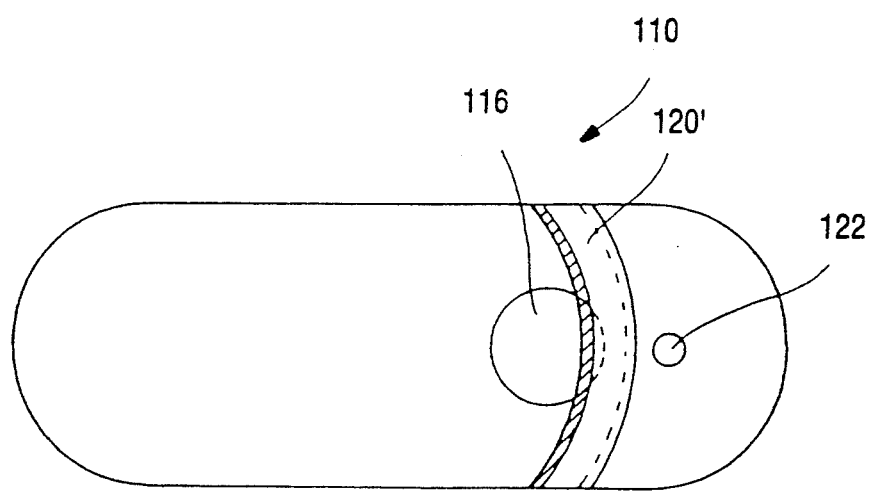
FIG. 10 is a top plan view of a deaerating vessel according to the invention with another modification of a weir according to the invention.

FIGS. 3 and 10 illustrate an exemplary deaeration vessel 110 according to the invention. In FIGS. 3 and 10 the components corresponding functionally to those of FIG. 1 are shown by the same reference numeral only preceded by a "1". In FIGS. 4–6, which illustrate different embodiments of the weir, the number of the FIGURE in which the weir has been illustrated is added to the end of the reference numerals.

A significant feature of a deaeration vessel 110 according to the invention is that the plate 120 forming the weir K, and the outlet 116 for deaerated suspension, are arranged adjacent each other so that the weir plate 120 is located essentially adjacent to the downstream side of the periphery of the outlet 116. (The weir K also is obviously spaced from the top of the vessel 110, which top contains the vacuum duct 118.) In practice this means that there is no threshold of any significance between the plate 120 and the duct 116 (a distance even as small as 50–200 mm might be a significant threshold, depending on the dimensions of the vessel 110 itself). In other words, according to the invention, the flow of deaerated suspension is directed from the deaeration vessel portion 126 along the plate 120 straight into the outlet 116.

An inlet header 112 is connected to inlet nozzles 114 which introduce liquid into the deaeration section 126, while liquid is withdrawn through outlet 122. In the deaeration section 126 the suspension has the level 124, while in the outlet portion 130 the liquid has a level 128.

The nozzles 114 extend through the bottom 132 of the vessel.

In the FIG. 4 embodiment the plate 1204 defining the weir K is fastened on the bottom 1324 of the vessel essentially adjacent to the downstream side of the periphery of the outlet 1164. It is, furthermore, desirable that the plate 1204 be inclined in a direction opposite to the direction of the flow over the weir K so, that the plate 1204 directs the flow into outlet 1164. That is, the top surface 31 of the plate 1204, which forms the weir K, is above outlet 1164. In FIG. 4, the plate 1204 is substantially linear and makes an angle of less than 90° (e.g. about 60°) with respect to the bottom 1324.

In the FIG. 5 embodiment the plate 1205 is fastened as in the FIG. 4 embodiment, but the plate 1205 itself differs from the plate 1204 in FIG. 4. The lower part 35, fastened to the bottom 1325 of the vessel 110, of the plate 1205 is essentially perpendicular to the bottom 1325, and the upper part 36 of the plate 1205 is inclined opposite the direction of liquid flow over weir K so that the plate 1205 directs the flow into outlet 1165. The orientation of the lower part 35 of the plate 1205 is essentially the same as that of the outlet 1165, i.e., if the outlet 1165 for some reason has been arranged at an angle against the bottom of the vessel 110, the plate 1205 is arranged so as to not cause an essential change in the direction of flow when the flow is redirected from plate 1205 to outlet 1165. Liquid is withdrawn through outlet 1225.

In FIG. 6 the plate 1206 is also fastened as in the FIG. 4 embodiment, but the plate 1206 differs from the plates of FIGS. 4 and 5. The plate 1206 is curved, preferably about a horizontal axis, so that the weir K extends in a direction opposite to the direction of the flow over the weir K so that the plate 1206 directs the flow smoothly into outlet 1166. Liquid is withdrawn through outlet 1226 in the bottom of 1326 of the vessel.

Figure 7:
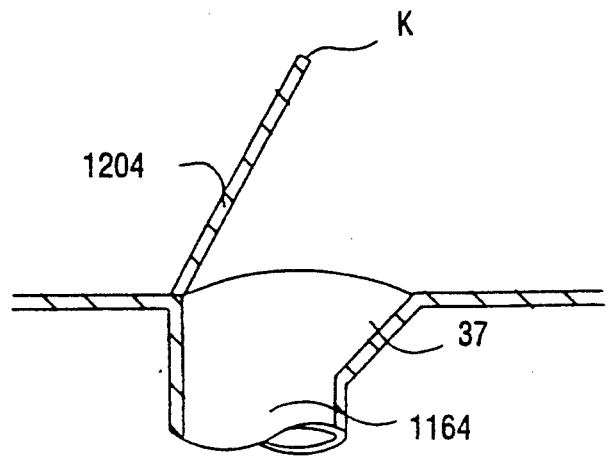
FIG. 7 illustrates the weir disclosed in FIG. 4 with a modified outlet associated therewith.
Figure 8:
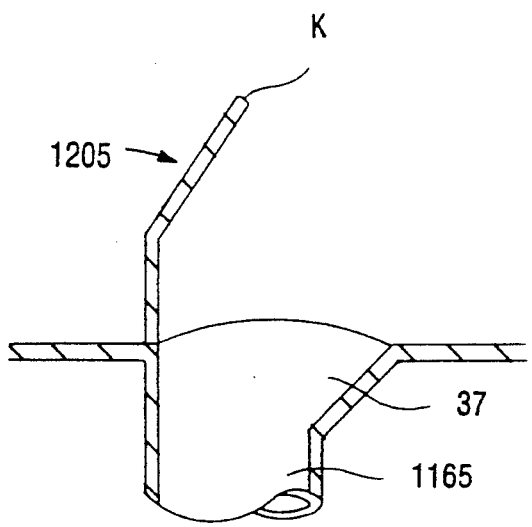
FIG. 8 illustrates the weir disclosed in FIG. 5 with a modified outlet associated therewith.
Figure 9:
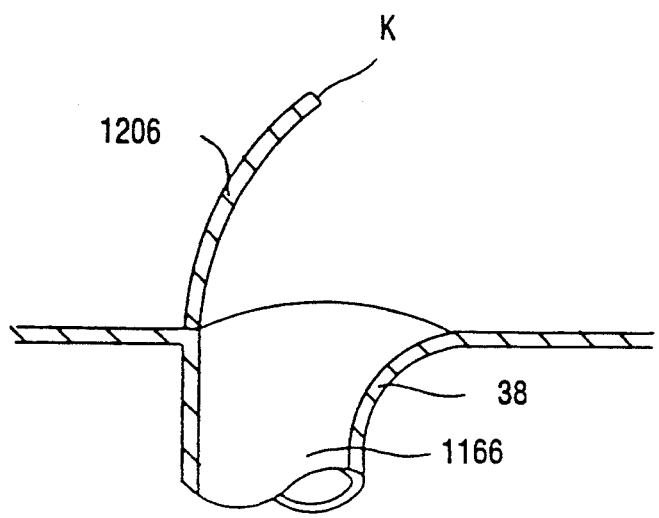
FIG. 9 illustrates the weir disclosed in FIG. 6 with a modified outlet associated therewith.

FIGS. 7, 8 and 9 illustrate plate constructions 1204, 1205 and 1206 with the weir K corresponding to those of FIGS. 4–6, but with an extension/cut 37, or a curved extension 38 (FIG. 9), facilitating the flow into outlet 1164–1166 arranged at the upstream side of the periphery of the outlet. That is the outlets 1164–1166 in FIGS. 7–9 are non-circular, having a larger cross-sectional area than those of FIGS. 4–6.

FIG. 10 illustrates, in plan, yet another preferred embodiment of weir in the deaeration vessel 110 according to the invention. FIG. 10 illustrates only the most relevant parts of the vessel, namely the outlet 122 for the separated light liquid, and outlet 116 for deaerated suspension. In this embodiment the plate 120' forming the weir is concave when seen from the direction of flow, i.e. the plate 120' is curved about a vertical axis. The plate 120' can also be curved when viewed from the side, i.e. curved about a horizontal axis, in which case the plate 120' is formed by a spherical surface. In the best possible situation the plate 120' should follow the contours of the periphery of the outlet 116, or the outlet 116 should be designed so as to follow the curve of the plate 120' in order to achieve a turbulent-free flow from the plate 120' to the outlet 116.

Closest to optimum results are achieved utilizing the plate 120' as illustrated in FIG. 10, forming a part of spherical surface or otherwise consisting of a multi-dimensionally curved surface, that directs the suspension flow smoothly to the outlet 116. If a curved plate 120' is utilized, the curve radius should be as large as possible, similar to the situation in paper-making machines, i.e. employed in the short circulation of a papermaking machine. The tubes employed in a paper-making machine have a directive curve radius of 3 times the diameter of the tube ensuring that the flow in the tube advances as laminarily as possible. According to the invention, the flow is smooth enough if the curve radius of the curved plate 120' or the radius of a circle drawn to touch the surface of a plate consisting of plane surfaces, is of the order of 1-2 times the diameter of the outlet 116.

It is to be noted that the greatest improvement over prior art according to the invention is achieved by arranging the plate or partition wall (e.g. 120, 120') forming the weir essentially adjacent to the downstream side of the periphery of the deaerated suspension outlet. Beyond this, all further improvements optimize the outlet flow of the deaerated suspension and the overflow, but improve little relative to the location of the partition wall.

It will thus be seen that according to the invention a deaeration vessel clearly differing from prior art has been provided. While in the described embodiments the plate defining the weir is always as perpendicular to the bottom of the plate or as inclined against the overflow, the plate can in some cases be inclined in the opposite direction, but always so that the upper lip of the plate of the weir is directed against the flow. The direction of the outlet for the deaerated suspension can also differ from that shown in the drawings, which in turn can naturally cause some changes in the positioning or location of the plate.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of deaerating cellulose pulp having a consistency of about 0.1-3% utilizing a hollow vessel having a weir disposed therein defining a liquid level within the vessel interior, and dividing the vessel interior into first and second portions, comprising the steps of:

introducing pulp suspension into the vessel first portion above the liquid level;
   withdrawing gas which separates from the pulp suspension from above the liquid level;
   withdrawing liquid that passes over the weir from the second portion of the vessel; and
   withdrawing deaerated pulp from the vessel first portion through an outlet immediately adjacent the weir so as to minimize turbulence in and of the deaerated pulp suspension withdrawn from the vessel first portion.

2. A method as recited in claim 1 comprising the further step of directing the flow of pulp suspension in the first portion of the vessel interior toward the bottom of the weir by configuring the weir so that the top surface, liquid level defining, portion thereof overlies the outlet through which the deaerated pulp suspension is withdrawn.

3. A deaeration vessel comprising:
   a hollow vessel body having a bottom and a top;
   means for introducing fluent material to be deaerated into said vessel, above said bottom, a fluent material level being established in said vessel body;
   means for withdrawing gas separated from said fluent material above the level of fluent material in said body;
   a partition wall dividing said hollow vessel body into first and second portions and defining a weir and having a top surface which establishes the level of fluent material in said vessel body, said partition wall extending upwardly from said bottom;
   said means for introducing fluent material disposed in said first portion of said vessel body; and
   outlet means for deaerated fluent material disposed in said bottom of said first portion of said vessel body immediately adjacent said partition wall, so as to minimize turbulence in and of the deaerated pulp suspension withdrawn therethrough.

4. A deaeration vessel as recited in claim 3 wherein said outlet means is spaced no more than about 50-250 mm from said partition wall at said vessel bottom.

5. A deaeration vessel as recited in claim 3 wherein said top surface of said partition wall is disposed above, and overlies said outlet means so that said partition wall directs fluent material toward said outlet means.

6. A deaeration vessel as recited in claim 5 wherein said partition wall has a substantially continuous curvature from said bottom to said top surface.

7. A deaeration vessel as recited in claim 6 wherein said partition wall is curved about a horizontal axis.

8. A deaeration vessel as recited in claim 6 wherein said partition wall is curved about a vertical axis.

9. A deaeration vessel as recited in claim 6 wherein said outlet means comprises a conduit that is circular in cross-section, having a diameter; and wherein said partition wall has a radius of curvature at least as great as said diameter.

10. A deaeration vessel as recited in claim 9 wherein said outlet means has a non-circular cross-section having the largest diameter greater than said conduit diameter, at said vessel bottom, and tapering to said conduit.

11. A deaeration vessel as recited in claim 5 wherein said partition wall comprises a first portion extending substantially vertically straight upwardly from said bottom, and a second portion, including said top surface, extending at an angle with respect to said first portion.

12. A deaeration vessel as recited in claim 5 wherein said partition wall is disposed in substantially a straight line and makes an angle of less than 90° with respect to said bottom.

13. A deaeration vessel as recited in claim 3 wherein said partition wall comprises part of a spherical surface.

14. A deaeration vessel as recited in claim 3 further comprising means defining an outlet in said bottom of said second portion of said vessel body for discharging liquid overflowing said weir.

15. A deaeration vessel as recited in claim 14 wherein said means for withdrawing gas separated from said fluent medium comprises means defining a conduit in said top of said hollow vessel body, and a vacuum pump operatively connected to said conduit.

16. A deaeration vessel as recited in claim 15 wherein said means for introducing fluent material to be deaerated into said vessel comprises a header and a plurality of substantially vertically extending pipes each having an open top disposed above said top surface of said partition wall.

17. A deaeration vessel as recited in claim 16 wherein said outlet means is spaced no more than about 0–250 mm from said partition wall at said vessel bottom.

18. A deaeration vessel as recited in claim 17 wherein said top surface of said partition wall is disposed above said outlet means so that said partition wall directs fluent material toward said outlet means.

19. A deaeration vessel as recited in claim 16 wherein said partition wall has a substantially continuous curvature from said bottom to said top surface.

20. A deaeration vessel as recited in claim 16 wherein said partition wall comprises a first portion extending substantially vertically straight upwardly from said bottom, and a second portion, including said top surface, extending at an angle with respect to said first portion.

21. A deaeration vessel as recited in claim 16 wherein said partition wall is disposed in substantially a straight line and makes an angle of less than 90° with respect to said bottom.

22. A deaeration vessel as recited in claim 3 wherein said partition wall is curved about a vertical axis.

* * * * *